United States Patent
Liu et al.

(10) Patent No.: US 10,944,100 B2
(45) Date of Patent: Mar. 9, 2021

(54) ELECTROCHEMICAL CELL INCLUDING ANODE AND CATHODE INCLUDING BATTERY AND CAPACITOR PARTICLES AND HAVING EQUAL ELECTROCHEMICAL CAPACITIES, AND METHOD FOR FORMING THE SAME

(71) Applicant: GM GLOBAL TECHNOLOGY OPERATIONS LLC, Detroit, MI (US)

(72) Inventors: Haijing Liu, Shanghai (CN); Zhiqiang Yu, Shanghai (CN); Dewen Kong, Shanghai (CN); Meiyuan Wu, Shanghai (CN)

(73) Assignee: GM Global Technology Operations LLC, Detroit, MI (US)

( * ) Notice: Subject to any disclaimer, the term of this patent is extended or adjusted under 35 U.S.C. 154(b) by 117 days.

(21) Appl. No.: 16/098,457

(22) PCT Filed: Jun. 1, 2016

(86) PCT No.: PCT/CN2016/084249
§ 371 (c)(1),
(2) Date: Nov. 2, 2018

(87) PCT Pub. No.: WO2017/206095
PCT Pub. Date: Dec. 7, 2017

(65) Prior Publication Data
US 2019/0157659 A1   May 23, 2019

(51) Int. Cl.
*H01M 4/139* (2010.01)
*H01M 4/04* (2006.01)
(Continued)

(52) U.S. Cl.
CPC .............. *H01M 4/139* (2013.01); *H01G 11/06* (2013.01); *H01G 11/28* (2013.01); *H01G 11/32* (2013.01);
(Continued)

(58) Field of Classification Search
CPC ...... H01M 4/139; H01M 4/0404; H01M 4/13; H01M 4/364; H01M 4/366; H01M 4/62;
(Continued)

(56) References Cited

U.S. PATENT DOCUMENTS

| | | | |
|---|---|---|---|
| 5,744,258 A * | 4/1998 | Bai .................. | H01M 4/04 429/209 |
| 2003/0157409 A1 * | 8/2003 | Huang .............. | H01M 10/0569 429/306 |

(Continued)

FOREIGN PATENT DOCUMENTS

| CN | 101290833 A | 10/2008 |
|---|---|---|
| CN | 101320821 A | 12/2008 |

(Continued)

OTHER PUBLICATIONS

Cericola et al., Hybridizaiton of electrochemical capacitors and rechargeable batteries: An experimental analysis of the different possible approaches utilizing activated carbon, $Li_4Ti_5O_{12}$ and $LiMn_2O_4$, Aug. 2011, Journal of Power Sources, 196, 10305-10313 (Year: 2011).*

(Continued)

*Primary Examiner* — Sean P Cullen
(74) *Attorney, Agent, or Firm* — Quinn IP Law (57) ABSTRACT

At least one of the anode and cathode of a lithium-ion processing electrochemical cell are prepared with a layer of mixed particles of both active lithium battery electrode materials and lithium ion adsorbing capacitor materials, or with co-extensive, contiguous layers of battery electrode (Continued)

particles in one layer and capacitor particles in the adjoining layer. The proportions of active battery electrode particles and active capacitor particles in one or both of the electrodes are predetermined to provide specified energy density (Wh/kg) and power density (W/kg) properties of the cell for its intended application.

16 Claims, 1 Drawing Sheet (51) Int. Cl.
| | | |
|---|---|---|
| H01M 4/36 | (2006.01) | |
| H01M 4/62 | (2006.01) | |
| H01M 10/0585 | (2010.01) | |
| H01M 4/13 | (2010.01) | |
| H01M 12/00 | (2006.01) | |
| H01M 10/052 | (2010.01) | |
| H01G 11/32 | (2013.01) | |
| H01G 11/38 | (2013.01) | |
| H01G 11/06 | (2013.01) | |
| H01G 11/28 | (2013.01) | |
| H01G 11/50 | (2013.01) | |
| H01G 11/86 | (2013.01) | |
| H01M 10/0525 | (2010.01) | |
| H01G 11/04 | (2013.01) | |
| H01G 11/62 | (2013.01) | |

(52) U.S. Cl.
CPC ............. *H01G 11/38* (2013.01); *H01G 11/50* (2013.01); *H01G 11/86* (2013.01); *H01M 4/0404* (2013.01); *H01M 4/13* (2013.01); *H01M 4/364* (2013.01); *H01M 4/366* (2013.01); *H01M 4/62* (2013.01); *H01M 10/052* (2013.01); *H01M 10/0525* (2013.01); *H01M 10/0585* (2013.01); *H01M 12/005* (2013.01); *H01G 11/04* (2013.01); *H01G 11/62* (2013.01); *Y02T 10/70* (2013.01)

(58) Field of Classification Search
CPC ........... H01M 10/052; H01M 10/0525; H01M 10/0585; H01M 12/005; H01G 11/06; H01G 11/28; H01G 11/32; H01G 11/38; H01G 11/50; H01G 11/86
USPC .............................. 429/209, 217, 218.1, 233
See application file for complete search history.

(56) References Cited

U.S. PATENT DOCUMENTS

| | | | | |
|---|---|---|---|---|
| 2009/0081529 | A1* | 3/2009 | Thackeray | H01M 4/366 429/52 |
| 2009/0081557 | A1* | 3/2009 | Chen | H01M 4/382 429/337 |
| 2012/0321913 | A1* | 12/2012 | Hua | H01M 4/667 429/7 |
| 2013/0126794 | A1* | 5/2013 | Lee | D01F 9/14 252/506 |
| 2013/0194721 | A1 | 8/2013 | Cho et al. | |
| 2014/0043727 | A1* | 2/2014 | Lv | H01M 10/0525 361/502 |
| 2014/0370386 | A1* | 12/2014 | Hirono | H01M 4/386 429/220 |
| 2015/0333364 | A1* | 11/2015 | Tang | H01M 2/0486 429/336 |
| 2017/0040596 | A1* | 2/2017 | Wang | H01M 10/0525 |
| 2017/0092439 | A1* | 3/2017 | Hahn | H01G 11/34 |
| 2017/0125812 | A1* | 5/2017 | Kawamura | H01M 10/0525 |
| 2017/0170459 | A1* | 6/2017 | Pol | H01M 4/362 |
| 2018/0062160 | A1* | 3/2018 | Kasamatsu | H01M 4/386 |
| 2018/0342756 | A1* | 11/2018 | Song | H01M 2/1686 |
| 2019/0229336 | A1* | 7/2019 | Palani | H01M 4/621 |
| 2019/0296342 | A1* | 9/2019 | Harada | B60L 50/66 |
| 2020/0235398 | A1* | 7/2020 | Sonobe | C08F 220/18 |

FOREIGN PATENT DOCUMENTS

| | | | |
|---|---|---|---|
| CN | 101320821 B | * | 7/2010 |
| CN | 101807683 A | | 8/2010 |
| CN | 101840787 A | | 9/2010 |
| CN | 101847513 A | | 9/2010 |
| CN | 102201604 A | | 9/2011 |
| CN | 102842703 A | | 12/2012 |
| CN | 102938325 A | | 2/2013 |
| CN | 105336504 A | | 2/2016 |
| CN | 105632774 A | * | 6/2016 |
| KR | 1516500 B1 | | 5/2015 |

OTHER PUBLICATIONS

Sarkar et al., Mechanism of Charge Transfer in Olivine-Type $LiFeSiO_4$ and $LiFe_{0.5}Mo_{0.5}SiO_4$ (M = Mg or Al) Cathode Materials: First-Principles Analysis, Apr. 2015, The Journal of Physical Chemistry C, 119, 9125-9133 (Year: 2015).*

Thackeray et al., Advances in manganese-oxide 'composite' electrodes for lithium-ion batteries, Mar. 2005, Journal of Materials Chemistry, 15, 2257-2267 (Year: 2005).*

International Search Report and Written Opinion for application PCT/CN2016/084249 filed Jan. 24, 2017; 11 pages.

* cited by examiner

ELECTROCHEMICAL CELL INCLUDING ANODE AND CATHODE INCLUDING BATTERY AND CAPACITOR PARTICLES AND HAVING EQUAL ELECTROCHEMICAL CAPACITIES, AND METHOD FOR FORMING THE SAME

TECHNICAL FIELD

In an electrochemical cell each anode and cathode contains a mixture of particles, or overlying layers of particles, combining active electrode materials for both a lithium-ion battery cell and for a compatible lithium ion adsorbing capacitor. Combinations of such anodes and cathodes, each with predetermined proportions of battery and capacitor electrode materials and a suitable non-aqueous, liquid, lithium cation-containing electrolyte, can provide a desired balanced combination of battery properties and capacitor properties in each operating cell.

BACKGROUND OF THE INVENTION

The material presented as background information in this section of the specification is not necessarily prior art.

Electric-powered automotive vehicles use multi-cell batteries to provide electrical energy for providing electrical power for driving the vehicle and for providing electrical energy to many devices on the vehicle. Batteries comprising many lithium-ion electrochemical cells are examples of such electrical power sources. And such batteries are used in many non-automotive applications.

In some applications it may be useful to combine a lithium-ion battery with a capacitor. For example, such capacitors may be charged during braking of the vehicle and the stored electrical charge used in recharging cells of the lithium-ion battery.

There is a need for a practice to jointly package and employ cells for lithium-ion batteries and such capacitors for efficiency in their mutual interconnection and interaction.

SUMMARY

This invention pertains to the incorporation of both lithium ion intercalation/de-intercalation electrode materials (battery materials) and lithium ion adsorption-desorption electrode materials (capacitor materials) into one or both of the respective electrodes of an electrochemical cell. The lithium ion processing materials are selected and used as small (micrometer-scale) particles such that the combined active anode materials and the combined active cathode materials of each cell may be capable of both intercalating and adsorbing lithium ions and corresponding anions from a non-aqueous liquid electrolyte. In general, the process of intercalation/de-intercalation occurs throughout the whole volume of the selected battery electrode material. A gram of battery electrode material can usually intercalate a greater amount of lithium ions than are adsorbed on the surfaces of capacitor particles. But the release of lithium ions from battery particles is typically slower than the release of lithium ions from selected capacitor particles. The battery particles are typically capable of producing more energy per gram than capacitor particles, but the capacitor particles release adsorbed lithium ions faster and are typically capable of providing more power per gram than battery particles.

By incorporating predetermined amounts of suitable capacitor materials with battery electrode materials in one or both of the anode and cathode of the electrochemical cell, the power level, energy level, and cycle life of a hybrid lithium-ion battery/capacitor may be balanced for its intended use or application. As will be described, by varying the content of capacitor material mixed with lithium-ion battery material in one or both of the electrodes of each cell, the performance of the battery may be better adapted for varying applications, such as start/stop vehicle engine operation, applications requiring fast charging, shipping-port crane operation, state grid stabilizers, racing cars, etc. Each of these potential applications for lithium-processing electrochemical cells may present different requirements for energy density (Wh/kg) and for power density (W/kg). For many applications it is desired that the electrochemical cell be capable of producing an energy density between 40 Wh/kg and 150 Wh/kg and a power density between 1500 W/kg and 5800 W/kg.

In a preferred illustrative embodiment of the disclosure, particles of suitable lithium-ion battery electrode materials and suitable capacitor materials are applied to one or both faces of a compatible aluminum or copper collector sheet (typically a thin foil) as a porous, resin-bonded layer of substantially uniform thickness. As will be described in more detail below in this specification, a single porous layer of mixed battery and capacitor electrode material particles, also mixed with particles of a conductive carbon and coated with a polymeric binder may be bonded to both major surfaces of a current collector member. Or two separate, porous, resin-bonded layers of battery electrode particles and capacitor electrode particles, one layer overlying the other, each layer with particles of conductive carbon, may be sequentially bonded coextensively to the surface of a suitable current collector.

In general it is preferred that the respective electrochemical capacities of the anode and cathode, one or both containing battery and capacitor electrode particles, provide substantially equal electrochemical power capacities (in mWh or the like). As will be described, the proportions of the battery electrode particles and capacitor particles in the electrodes may be varied to provide different cell properties but the output capacities of the electrodes are balanced.

In an illustrative example, graphite particles may be used as the active lithium battery anode material and particles of lithium nickel manganese cobalt oxide (LiNiMnCoO$_2$, NMC) may be used as the active lithium battery cathode material. In one practice of this invention, generally electrochemically equivalent proportions of the battery electrode materials are applied to the anode and cathode of the cell but other proportions may also be used. A list of several suitable active anode and cathode materials for lithium batteries are presented below in this specification.

Suitable capacitor cathode and anode materials include, for example:

Metal Oxides, MOx, where M=Pb, Ge, Co, Ni, Cu, Fe, Mn, Ru, Rh, Pd, Cr, Mo, W, Nb). The selection of a specific oxide or a blended mixture of two or more oxides may be based on the oxides capacity and conductivity to adsorb and release lithium cations and corresponding anions for a specific application in a hybrid electrode. The cost of the metal oxide capacitor material may also be determinative. In practices of this invention the same oxide(s) may be used in both the anode and cathode. This practice is sometimes referred to as a pseudocapacitor.

Metal Sulfides, such as TiS$_2$, NiS, Ag$_4$Hf$_3$S$_8$, CuS, FeS, FeS$_2$. Again, the selection of a specific sulfide or a blended mixture of two or more sulfides may be based on the sulfides capacity and conductivity to adsorb and release lithium cations and corresponding anions for a specific application in a hybrid electrode. The cost of the metal sulfide capacitor material may also be determinative. Again, in practices of this invention the same sulfide(s) may be used in both the anode and cathode.

Various forms of carbon particles, such as activated carbon, activated carbon fibers, graphite, carbon aerogel, carbide-derived carbon, graphene, graphene oxide, carbon nanotubes. The selection of a carbon material may be based on its surface area, ion adsorption capacity, and cost. More than one type of carbon may be used in a blended capacitor material. The same carbon material may be used in both the anode and cathode in an electric double-layer capacitor (EDLC). Graphite may be used in an anode as both the battery material and the capacitor material, but the relatively low surface area of graphite may limit its capacity as a capacitor material.

Particles of one or more of the following polymers may be used as capacitor material in the cathode of the cell; poly (3-methyl thiophene), polyaniline, polypyrrole, poly(para-phenylene), polyacene, polythiophene, and polyacetylene.

Each anode and cathode may be in the form of uniformly thick, porous layers of active electrode material deposited on both sides of a rectangular current collector foil, where each foil has an uncoated connector tab extending from one side for suitable connections with other electrodes in the cell or groups of cells. One or more pairs of alternating anode and cathode layers are assembled face-to-face (stacked) but physically separated with a thin co-extensive porous separator. The porous anode material layer(s), porous separator, and porous cathode material layer(s) are infiltrated with a non-aqueous liquid electrolyte solution for the transfer of lithium cations and corresponding anions between the anode and cathode. Each of the current collector foils has an un-coated tab for suitable physical connection to other electrodes in a grouping of cells or to a workload to be powered and/or to a charging device.

By way of example, a mixture of hybrid cathode materials on a current collector foil may contain a resin-bonded particulate mixture of activated carbon as capacitor material, NMC as battery material, and conductive carbon (for enhanced electrical conductivity. A resin-bonded particulate mixture of hybrid anode material on a current collector foil may contain graphite as the battery material, activated carbon as the capacitor material, and conductive carbon for suitable electron conductivity. During charging of the cell, as electrons are flowing into the anode, lithium cations (Li+) are de-intercalated from the NMC particles in the cathode mixture and $PF_6^-$ anions are adsorbed into the activated carbon particles in the cathode mixture. At the anode during charging, lithium cations are intercalated into the graphite particles and lithium cations are adsorbed into the activated carbon particles. Adsorbed lithium cations are present on the surfaces of activated carbon particles are distinct and separate from the lithium cations which are intercalated into the layered graphite particles. Both processes occur during the charging of the hybrid anode materials.

As the electrochemical cell is being discharged these reactions are reversed. Electrons flow from the anode to a powered device as lithium ions are de-intercalated from the graphite. A separate and distinct group of lithium ions are desorbed from the activated carbon in the anode. These desorbed lithium cations contribute to the electron flow from the anode.

Lithium cations are intercalated into the NMC particles of the cathode and the activated carbon in the cathode desorbs $PF_6^-$ anions.

In embodiments of the invention, the anodes of the hybrid electrochemical cell are prepared with a suitable predetermined mixture of active lithium-ion battery materials and lithium ion adsorbing capacitor materials and the cathodes are prepared with a suitable predetermined mixture of compatible active battery and capacitor materials. The lithium-ion battery constituents are provided to satisfy the energy (Wh) or energy density (Wh/kg) requirements of the electrochemical cell and the capacitor constituents are provided to provide the power mode (W) or power density (W/kg) requirements of the electrochemical cell. In general, it is preferred to combine electrode compositions to form a hybrid electrochemical cell producing an energy density in the range of 40 Wh/kg to 150 Wh/kg and a power density in the range of 1500 W/kg and 5800 W/kg. Values of energy density and power density depend on the compositions of the battery electrode materials and of the capacitor electrode materials, and on the ratio of contents of battery electrode materials and capacitor electrode materials. In general energy density is improved by increasing battery material content and/or by selecting high specific energy battery electrode materials. And the power density of the hybrid electrochemical cell is increased by increasing the content of capacitor electrode material and/or by selecting high specific power density capacitor compositions.

In the examples of hybrid cells of this disclosure, the respective capacities (mWh) of the anode and cathode are equivalent or substantially equivalent. The respective electrodes are formulated such that the sum of the capacities of the battery materials and capacitor materials (if any) in the cathode are equivalent to sum of the capacities of the battery materials and capacitor materials (if any) in the anode. But the proportions of the battery electrode materials and capacitor electrode materials may be varied depending on the energy mode and power mode requirements of the hybrid cell. This may be accomplished by varying the proportions of the capacitor material and the battery material between the anode and cathode of the cell. In other words, the capacities of the anode and cathode capacitor material to adsorb lithium cations, and their corresponding anions, do not have to be equal. And the proportions of the anode and cathode battery material to intercalate lithium ions do not have to be equal. It is possible to tune or vary the energy and power performance of the electrochemical cell by varying the amount and composition of the capacitor material placed in the cathode (Ccap) and/or anode (Acap). Such tuning can be done in a few different ways.

For the purpose of presenting a series of five illustrative examples, a common group of particulate battery and capacitor anode and cathode materials will be used. In these examples an anode of a subject hybridized lithium cell is usually formed of graphite as the battery material and activated carbon (AC) as the capacitor material. And the cathode is usually formed of lithium nickel manganese cobalt oxide (NMC) as the battery material and (AC) as the capacitor material. In these examples, the electrochemical capacity of the cathode and anode of cell will each be maintained at about 150 mAh. In these examples of hybrid electrode formulations, the specific capacity of NMC is considered to be about 150 mAh/g, the specific capacity of graphite is about 350 mAh/g, and the specific capacity of activated carbon is about 50 mAh/g. In the following five examples, modification of the hybrid cathode compositions and the hybrid anode compositions is described in terms of the capacity contents delivered by the capacitor materials of the cathode (Ccap) and of the anode (Acap).

Example 1

In this Example the capacity contents of the cathode and anode capacitor materials are equal (Ccap=Acap). And the capacities of the cathode and anode materials are also equal in this example.

A cathode composition is prepared with a NMC content (0.67 g) which contributes 100 mAh through its intercalation mechanism and activated carbon (1.0 g) which contributes 50 mAh through its adsorption mechanism. The anode is then prepared with an activated carbon content (1.0 g) balancing the 50 mAh capacity of the activated carbon in the cathode. The anode is also prepared with a graphite content of 0.29 g to balance the 100 mAh capacity contribution of the NMC in the cathode. Thus, the battery capacities of the anode and cathode are equal (100 mAh) and the capacitor capacities of the anode and cathode are equal (50 mAh). We characterize this type of hybrid type of cell as providing both lithium ion battery properties (LIB) and capacitor properties (CAP) or as LIB+CAP.

The relative contributions of the battery materials and capacitor materials in the electrodes may be varied by varying their weight proportions in the electrodes.

Example 2

In this example, content of the capacitor material in the cathode is reduced with respect to the capacitor material in the anode, i.e. Ccap<Acap. But in this example the electrode materials of the hybrid cells are formulated such that the total capacities of the anode (150 mAh) and of the cathode (150 mAh) remain the same. The regular capacitor function of the cell (based on activated carbon) is reduced proportionally and the function of the hybrid cell displays the functions of a LIB, a CAP and of a lithium ion capacitor (LIC, sometimes called a supercapacitor) due to the imbalance of capacitor materials in the electrodes, with the greater quantity of capacitor material (activated carbon) in the anode and the presence of available NMC.

An LIC is a hybrid electrochemical energy storage device which combines the intercalation mechanism of a lithium ion battery with the adsorption mechanism of an electric double-layer capacitor (EDLC). One of the electrodes is pure EDLC material, activated carbon, only with the adsorption/desorption reaction on the surface of electrode. At the same time, the other electrode is pure lithium ion battery material, such as carbon material which is pre-doped with lithium ion or NMC or lithium titanium oxide, etc., to provide the intercalation/de-intercalation reaction. Such is a composition of a stand-alone lithium-ion capacitor (LIC). But the subject hybrid electrodes both also contain battery electrode materials.

In this example of hybrid electrode materials, the capacitor materials of the electrodes are not balanced in adsorption capacity, and the battery materials are not balanced in their capacity to intercalate lithium ions. The capacity of the capacitor material in the cathode does not balance the capacity of the capacitor material in the anode.

In this example, the cathode material is formulated as a particulate mixture with 0.6 g of activated carbon to provide a capacity of 30 mAh and with 0.8 g of NMC to provide a capacity of 120 mAh. And in this example, the anode material is prepared as a particulate mixture of 0.29 g graphite to provide a capacity of 100 mAh and of 1.0 g of activated carbon to provide an adsorption capacity of 50 mAh.

There are not capacity compatible amounts of graphite and AC in the anode. The amount of graphite is less than the compatible amount, and the amount of AC in the anode is more than the compatible amount with respect to the graphite. So there is some residual NMC in the cathode and some residual AC in anode, which will tend to form a LIC because of the performance resulting from imbalance of NMC//AC in the anode. This combination tends to balance the power producing and energy producing capabilities of the hybrid cell. Again, the effects of the combination of LIB+LIC+CAP may be varied by the selected formulation of capacitor and battery materials in the anode and cathode of the cell. For example, the combination of LIC and CAP may permit the cell to re-charged more rapidly.

Example 3

In this example content of the capacitor material in the cathode is increased with respect to the capacitor material in the anode, i.e. Ccap>Acap. Again, in this example the electrode materials of the hybrid cells are formulated such that the total capacities of the anode (150 mAh) and of the cathode (150 mAh) remain the same. The capacitor function of the cell is reduced proportionally and the function of the hybrid cell displays the functions of a LIB, a CAP and of a lithium ion capacitor (LIC) due to the imbalance of capacitor materials in the electrodes, with the greater quantity of capacitor material now in the cathode.

In this example the cathode material is formulated as a particulate mixture with 1.0 g of activated carbon to provide a capacity of 50 mAh and with 0.67 g of NMC to provide a capacity of 100 mAh. And in this example, the anode material is prepared as a particulate mixture of 0.34 g graphite to provide a capacity of 120 mAh and of 0.6 g of activated carbon to provide an adsorption capacity of 30 mAh.

When Ccap>Acap, the capacitor function of the cell is reduced proportionally and, again, the function of a LIC appears. In this example 3, the function and properties of the LIC are based on the combination of activated carbon and graphite rather than on the combination of NMC and activated carbon. While the overall function of the hybrid cell may be represented as LIB+LIC+CAP in Example 3, the two LIC systems in Examples 2 and 3 may differ in energy density, power density, working voltage window and costs. The decision to reduce the proportion of Ccap or Acap with respect to the other may depend on the power requirements of the hybrid system.

Example 4

When Acap=0, the capacitor function of the cell is eliminated but the battery energy capacity of the cell is enhanced. The LiC function remains. (LIB+LIC). In this example the electrode materials of the hybrid cells are formulated such that the total capacities of the anode (150 mAh) and of the cathode (150 mAh) remain the same.

In this example 4, the function and properties of the LIC are based on the combination of activated carbon and graphite rather than on the combination of NMC and activated carbon. In this example, the active material of the anode is solely graphite particles (0.43 g) which provides a capacity of 150 mAh through its intercalation mechanism. The active material of the cathode is a particulate mixture of 0.67 g of NMC (100 mAh) and 1.0 g of activated carbon (50 mAh). This hybrid cell provides the mixed functions of a lithium battery (LIB) and a lithium capacitor (LIC).

Example 5

When Ccap=0, the capacitor function of the cell is eliminated but the battery energy capacity of the cell is enhanced. The LiC function remains. (LIB+LIC).

In this example, the active material of the capacitor is NMC (1.0 g) providing 150 mAh capacity through its intercalation mechanism. The anode comprises a mixture of 0.29 g of graphite providing 100 mAh through its intercalation mechanism, and 1.0 gram of activated carbon providing 50 mAh through its adsorption mechanism. This hybrid cell provides the mixed functions of a lithium battery (LIB) and a lithium capacitor (LIC).

In this example 5, the function and properties of the LIC are based on the combination of activated carbon and graphite rather than on the combination of NMC and activated carbon (in Example 4). While the overall function of this hybrid cell may be represented as LIB+LIC as in Example 4, the two LIC systems in Examples 4 and 5 may differ in energy density, power density, working voltage window and costs.

Thus, the use of a combination of lithium-ion battery materials with corresponding capacitor materials in both electrodes of an electrochemical cell provides proportioned battery performance and capacitor performance in a hybrid electrochemical cell. And the use of a combination of lithium-ion battery materials with capacitor materials in one of the anode or cathode of an electrochemical cell provides enhanced power in the lithium-ion battery.

Other objects and advantages of this invention will be apparent from detailed illustrations of practices of the disclosure which following this specification.

DESCRIPTION OF PREFERRED EMBODIMENTS

In accordance with practices of this invention, one or both of the anode and cathode of an electrochemical cell are formed with a mixture of compatible and complementary particulate electrode materials suitable for a lithium-ion battery and for a capacitor in which the electrode functions by intercalating/de-intercalating and adsorbing and desorbing lithium cations and associated anions from a non-aqueous electrolyte solution. When both the anode and cathode of a cell both contain suitable lithium-ion battery materials and capacitor materials in predetermined proportions, the power and energy performance of the electrochemical cell may be balanced for specific application for which the cell is intended.

When one of the anode or cathode contains a predetermined hybrid mixture of particulate active battery and capacitor materials, the performance of the battery is modified.

A further listing of anode and cathode materials for lithium batteries includes:

Suitable battery cathode materials include:
$Li_xMO_2$ (M=Co, Ni, Mn, Cr, V),
$Li_xM_2O_4$ (M=Co, Ni, Mn, Cr, V),
$Li_xNi_yM_{1-y}O_2$ (M=Fe, Mn),
$LiNi_{1-x-y-z}Co_xM_{1-y}M_2zO_2$ ($M_1$, $M_2$=Al, Ni, Co, Fe, Mn, V, Cr, Ti, W, Ta, Mo),
$LiMn_{2-x}M_xO_4$ (M=Co, Ni, Fe, Cu, Cr, V),
$LiNiVO_4$, $LiNbO_3$, $LiFePO_4$, $LiTi_2(PO_4)_3$, $Li_3V_2(PO_4)_3$, $LiMPO_4$ (M-Ti, Ge, Zr, Hf), $Li_3FeV(PO_4)_3$, $LiFeNb(PO_4)_3$, $Li_2FeNb(PO_4)_3$, $Li_xFe_yMn_{1-y}PO_4$, $LiMSiO_4$ (M=Mn, Fe), $Li_xFe_2(WO_4)_3$, $Li_xFe_2(SO_4)_3$, and $LiFeO_2$.

Suitable battery anode materials include:

Forms of carbon: graphite, MCMB, hard carbon, soft carbon, activated carbon, amorphous carbon.

Metals: Si, Sn, Sb, Ge, Pb.

Metal alloys: $FeSn_2$, $Co_3Sn_2$, $CoSn$, $CoSn_2$, $Ni_3Sn_2$, $Ni_3Sn_4$, $Mg_2Sn$, $Co_xCu_{6-x}Sn_5$ ($0 \leq x \leq 2$), $SnMx$ (M=Sb, Cd, Ni, Mo, Fe), $MSi_2$ (M=Fe, Co, Ca, Ni), $Cu_2Sb$, $CoSb_2$, $FeSb_2$, $Zn_4Sb_3$, $CoSb_3$, $CoFe_3Sb_{12}$, $InSb$, etc.

Metal oxides: $MOx$ (M=Sn, Si, Pb, Ge, Co, Ni, Cu, Fe, Pd, Cr, Mo, W, Nb), $CaSnO_3$, $Al_2(MoO_4)_3$, etc.

Lithium metal oxide: $Li_4Ti_5O_{12}$, $LiTi_2O_4$, $LiTi_2(PO_4)_3$, etc.

Metal sulfide: $TiS_2$, $MoS_2$, etc.

Metal nitride: $M_3N$ (M=Fe, Co, Cu, Ni), $M_3N_4$ (M=Sn, Ge), $Zn_3N_2$, $CrN$, $VN$, $CrxFe_{(1-x)}N$, $Li_3FeN_2$, $Li_3$-$xMxN$ (M=Co, Ni, Fe, Cu), $Li_7MnN_4$, etc.

Metal carbide: SiC, TiC, etc.

Metal phosphide: $VP_2$, $ZnP_2$, $FeP_2$, $CoP_3$, $MnP_4$, $CrP$, $Sn_4P_3$, $Ni_2P$, etc.

Polymers: polypyrrole, polyaniline, etc.

A substantial listing of lithium-adsorbing capacitor materials for the hybrid anode and cathode mixtures has been presented above in this specification.

The particulate battery and capacitor electrode materials may be mixed and bonded to a current collector as a single hybrid anode or cathode layer. Or they may be applied as separate battery and capacitor material layers on a current collector. The active battery and capacitor electrode materials are prepared in the form of micrometer-size particles, mixed with like-sized particles of conductive carbon. Conductive carbons have different particle sizes based on different sources of the carbon. For example, some conductive carbons are nanometer size (Super P) and some are micrometer-size (KS6). The electrode material particles and conductive carbon particles are coated with a suitable polymeric binder resin such as polyvinylidene difluoride (PVDF) for the formation of the porous layers of electrode materials on the current collectors. The preparation of the hybrid anode and cathode layers is described in detail below in this specification.

The respective electrode members are often formed as rectangular sheets or layers and assembled as intermixed cathodes and anodes in a stacked assembly. Each anode is separated from a facing cathode by an interposed separator. This may be accomplished, for example, by the use of a relatively long, porous, polypropylene separator sheet that is wound back and forth between each facing surface of a layer of anode structure and cathode structure. An assembled structure of a predetermined number of one or more paired anode-cathode cells is paced in a closely fitting pouch or other suitable container. The pores of the separator layers and the alternating anode and cathode layers are infiltrated with a suitable non-aqueous solution of a lithium salt, the solution containing a predetermined amount of lithium cations and associated anions.

The common electrolyte for the subject hybridized electrochemical cell may be a suitable lithium salt dissolved in one or more organic liquid solvents. Examples of salts include lithium bis(oxalate)borate (LiBOB), lithium oxalyldifluoroborate (LiODFB), lithium fluoroalkylphosphate (LiFAP), lithium hexafluoroarsenate (LiPF$_6$), lithium hexafluoroarsenate (LiAsF$_6$), lithium tetrafluoroborate (LiBF$_4$), lithium perchlorate (LiClO$_4$), lithium trifluoromethanesulfonate (LiCF$_3$SO$_3$), lithium trifluoroethanesulfonimide (LiTFESI), lithium bis(fluorosulfonyl)imide (LiFSI), lithium bis-trifluoromethanesulfonimide (LiTFMSI), and the like. Some examples of solvents that may be used to dissolve the electrolyte salt include ethylene carbonate, dimethyl carbonate, methylethyl carbonate, and propylene carbonate. There are other lithium salts that may be used and other solvents. But a combination of lithium salt and non-aqueous liquid solvent is selected for providing suitable mobility and transport of lithium ions between the opposing electrodes in the operation of both electrode compositions of the hybrid battery/capacitor electrochemical cell. And the lithium salt is capable of forming a suitable amount of cations and anions in the electrolyte solution for operation of both electrodes of the hybrid electrode materials of either or both of the hybrid electrode compositions.

The nonaqueous electrolyte solution is carefully dispersed into and between closely spaced layers of the electrode elements and separator layers of each electrode of the hybrid cell.

The porous separator may be formed of a porous film or of porous interwoven fibers of suitable polymer material, or of ceramic particles, or a polymer material filled with ceramic particles. Suitable polymer materials include, for example, porous films or layers of polyethylene, polypropylene, and poly (ethylene-propylene). In the assembly of the hybrid electrodes, the porous separator layer is filled with a liquid lithium-ion containing electrolyte and enables the transport of lithium ions between the porous electrode members. But the separator layer is used to prevent direct electrical contact between each of the negative and positive electrode material layers in each unit, and is shaped and sized to serve this function.

Figure 1:
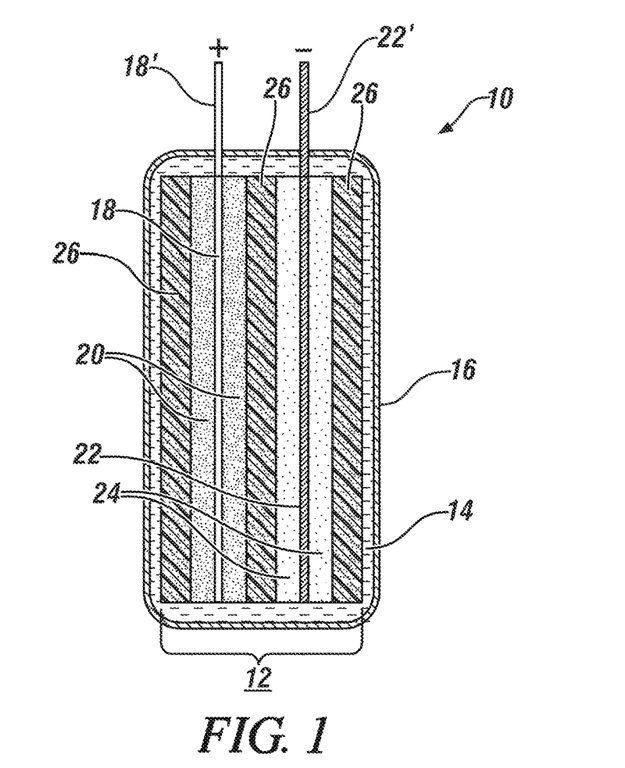
FIG. 1 is a schematic, cross-sectional side view of an anode current collector foil coated on both major sides with a mixture of active material particles for a lithium-ion battery anode and a capacitor anode, a cathode current collector foil coated on both sides with a mixture of active material particles for a lithium-ion battery cathode and a capacitor cathode. The two electrodes are rectangular in shape (not visible in the side view of FIG. 1). The opposing major faces of the anode and cathode are physically separated by porous rectangular polymer separator layer wound from the full outer surface of the cathode, around one edge of the cathode to fully cover the inner face of the cathode and separate it from the adjoining face of the anode, around the edge of the anode to cover the outer face of the anode. The two electrodes with their hybrid electrode materials are placed within a closely spaced pouch container. The pouch contains a non-aqueous electrolyte solution which permeates and fills the pores of the separator and of the respective active anode and cathode coating layers. The respective current collector foils have uncoated tabs extending up from their top sides and through the top surface of the pouch container.

FIG. 1 presents a simplified, schematic, cross-sectional side view of an assembly 10 of a single cell 12 of hybrid lithium-ion battery and lithium-ion adsorbing capacitor electrode materials assembled into a polymer-coated, aluminum foil pouch 16. The cell 12 with hybrid electrode materials comprises a cathode current collector foil 18 coated on both major sides with a porous layer of a mixture of active material particles 20 for a lithium-ion battery cathode and a capacitor cathode. Cell 12 also comprises an anode current collector foil 22 coated on both sides with a porous layer mixture of active material particles 24 for a lithium-ion battery anode and a capacitor anode. The two electrodes are rectangular in shape (not visible in the side view of FIG. 1). The opposing major faces of the anode and cathode are physically separated by porous rectangular polymer separator layer 26 which may be wound from the full outer surface of the cathode, around one edge of the cathode to separate the adjoining face of the anode and the cathode, around the edge of the anode to cover the outer face of the anode. The two electrodes with their hybrid electrode materials are placed within a closely spaced pouch container 16. The pouch 16 contains a non-aqueous electrolyte solution 14 which permeates and fills the pores of the separator and of the respective active anode and cathode coating layers 20, 24. The respective current collector foils 18, 22 have uncoated tabs 18', 22' extending up from their top sides and through the top surface of the pouch container 16.

As illustrated in FIG. 1, the hybrid mixtures of cathode material 20 and anode material 24 were each prepared as single layers of intermixed lithium-ion battery electrode material particles and lithium cation adsorbing capacitor materials which were bonded as substantially uniformly thick layers of resin-bonded particles on each main surface of the respective current collectors 18, 22. The connector tab portions 18', 22' of the current collector foils 18, 22 are not coated with electrode material. The hybrid electrode materials may be prepared in either of two processes. The processes will be illustrated using lithium battery cathode material and capacitor cathode material. But the processes are essentially the same on the preparation of anode materials.

A suitable lithium battery cathode material is selected, such as micrometer-size particles of lithium nickel manganese cobalt oxide (LiNiMnCoO$_2$, NMC). And suitable capacitor cathode material is selected, such as particles of activated carbon. The atomic or molecular proportions of the cathode materials are determined to provide a desired hybrid battery/capacitor effect in the cathode as well as in the anode of the cell. In a first process, the proportioned amount of the respective cathode particles are mixed and blended with each other and with a suitable (but, typically, a relatively smaller amount) of conductive carbon particles to enhance the electron conductivity of the finished cathode. The blended particle mixture may then be mixed as a slurry in a solution or dispersion of a polymer binder material. The binder may, for example be polyvinylidene difluoride polymer dissolved in NMP. The blended cathode particles and conductive carbon particles are mixed and slurried in the binder solution. The wet mixture is then carefully spread, in one or more applications, as a thin porous layer onto one or both of the intended surfaces of a suitable current collector foil, for example an aluminum current collector foil. The solvent, or liquid dispersant, is evaporated, or otherwise removed, to leave the porous layer of particles, resin-bonded to each other and to the surface of the metallic current collector foil.

Figure 2:
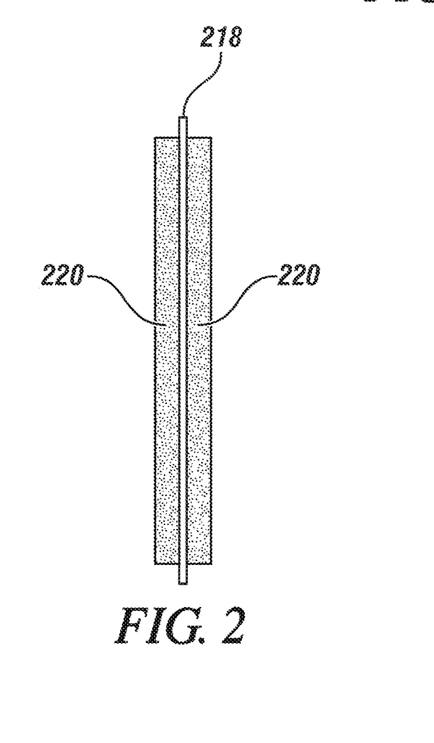
FIG. 2 is a schematic oblique view of a porous layer of intermixed particles of battery electrode material, capacitor electrode material, and conductive carbon bonded to both major surfaces of a rectangular current collector foil. The respective electrode materials may be a mixture of particles of lithium-ion battery cathode materials and capacitor cathode materials bonded to an aluminum foil. The particles of the two opposing layers are resin-bonded to each other and each layer is resin-bonded to a surface of the current collector. The current collector has an uncoated tab extending from one of its sides for connection to another hybrid electrode.

FIG. 2 is a side, elevational view of an illustrative cathode having a porous layer 220 of a hybrid mixture battery cathode material and capacitor cathode material deposited on both major faces of an aluminum current collector foil 218. As described with respect to FIG. 1, the overall hybrid electrode may have a rectangular shape. The thickness of the current collector foil is typically in the range of about five to fifteen micrometers and the thickness of the porous layers of hybrid cathode material is in the range of about fifty to one hundred-fifty micrometers.

Figure 3:
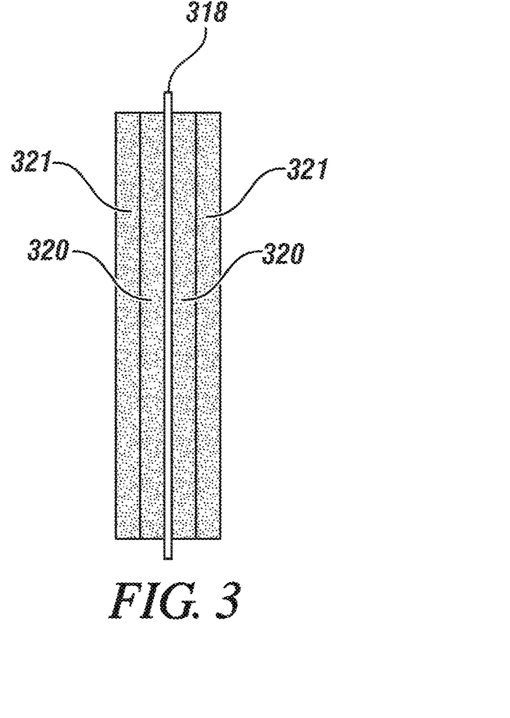
FIG. 3 is a schematic oblique view of a porous layer of, for example, particles of lithium-ion battery NMC cathode particles mixed with conductive carbon particles bonded to both major surfaces of a rectangular current collector foil. And a coextensive porous layer of capacitor cathode particles mixed with conductive carbon particles is resin bonded to the outer surfaces of the battery cathode layers. The current collector has an uncoated tab extending from one of its sides for connection to another hybrid electrode.

In a second process, the particles of cathode battery material and the particles of capacitor material are deposited separately to form two distinct porous layers, one porous layer preferably co-extensively overlying a first deposited layer, of porous electrode materials on a current collector foil. As illustrated in the side elevational view of FIG. 3, a first porous layer 320 of resin-bonded battery cathode particles is formed and bonded to each surface of current collector foil 318. A separately formed layer of capacitor cathode particles applied as a co-extensive porous resin bonded layer 321 to the outer surfaces of each first layer 320 of battery cathode particles. The separate layers of battery particles and capacitor particles may be applied in either or to both sides of the current collector or in reverse orders on opposing sides of the current collector. The total thickness of the two layers 320, 321 may be in the above specified range. But the thicknesses of the individual layers may vary depending on the intended proportions of their content in the electrode.

As stated in the Summary section of this specification, the object of this invention is to form a lithium ion based electrochemical cell in which the anode and cathode electrodes comprise active lithium battery electrode material particles in each of the anode and cathode. And at least one of the anode and cathode also contain particles of capacitor material particles which are composed to adsorb and desorp lithium ions that are in a surrounding lithium electrolyte solution. The compositions and amounts of the active materials of the two electrodes are such that the electrochemical capacities of the anode and cathode are balanced. But the respective proportions of battery and capacitor materials may be varied such that the function of the resulting hybrid cell and be varied from that of a lithium-ion battery and capacitor (LIB+CAP) or to a lithium ion battery, capacitor and lithium ion capacitor (LIB+CAP+LIC) or to a lithium ion battery and lithium ion capacitor (LIB+LIC).

The invention claimed is:

1. An electrochemical cell comprising an anode, a cathode, and an electrolyte solution containing a lithium electrolyte salt dissolved in a non-aqueous liquid solvent; the electrochemical cell being further characterized in that:

the anode and the cathode of the electrochemical cell each contain a layer of resin-bonded particles of an anode battery electrode material and resin-bonded particles of a cathode battery electrode material, respectively, bonded to at least one side of a current collector foil, the resin-bonded particles of the anode battery electrode material and the resin-bonded particles of the cathode battery electrode material being capable of intercalating lithium from the electrolyte solution and de-intercalating lithium into the electrolyte solution so that the resin-bonded particles of the anode battery electrode material in the anode and the resin bonded particles of the cathode battery electrode material in the cathode can function as a lithium-ion battery cell; and at least one of the anode or the cathode of the electrochemical cell also containing particles of a capacitor electrode material that are capable of adsorbing lithium cations or corresponding anions from the electrolyte solution and desorbing the lithium cations or the corresponding anions into the electrolyte solution to function as a capacitor, wherein the resin-bonded particles of the anode battery electrode material or a combination of the resin-bonded particles of the anode battery electrode material and the particles of the capacitor electrode material present in the anode, and the resin bonded particles of the cathode battery electrode material or a combination of the resin-bonded particles of the cathode battery electrode material and the particles of the capacitor electrode material in the cathode, provide equal electrochemical capacities in amperehours at each of the anode and the cathode and further provide a specified hybridized energy density (Wh/kg) and power density (W/kg) for the electrochemical cell, and wherein a capacity of the particles of the capacitor electrode material in the anode is less than a capacity of the particles of the capacitor electrode material in the cathode such that the electrochemical cell functions as a lithium-ion battery, a lithium-ion capacitor, and a capacitor.

2. An electrochemical cell as set forth in claim 1, wherein only the cathode contains the particles of the capacitor electrode material such that the electrochemical cell functions as a lithium-ion battery and a lithium-ion capacitor.

3. An electrochemical cell as set forth in claim 1, wherein the anode of the electrochemical cell contains the resin-bonded particles of the anode battery electrode material and the particles of the capacitor electrode material, and wherein the cathode of the electrochemical cell contains the resin-bonded particles of the cathode battery electrode material and the particles of the capacitor electrode material.

4. An electrochemical cell as set forth in claim 1, wherein the anode of the electrochemical cell contains the resin bonded particles of the anode battery electrode material and the particles of the capacitor electrode material, or wherein the cathode of the electrochemical cell contains the resin-bonded particles of the cathode battery electrode material and the particles of the capacitor electrode material.

5. An electrochemical cell as set forth in claim 1,
wherein at least one of (i) the anode of the electrochemical cell includes a mixture of the resin-bonded particles of the anode battery electrode material and the particles of the capacitor electrode material as a single porous resin-bonded electrode layer or (ii) the cathode of the electrochemical cell includes a mixture of the resin-bonded particles of the cathode battery electrode material and the particles of the capacitor electrode material as a single porous resin-bonded electrode layer.

6. An electrochemical cell as set forth in claim 1,
wherein at least one of (i) the anode of the electrochemical cell includes a layer of the resin-bonded particles of the anode battery electrode material and a separate, porous, adjacent, coextensive layer of the particles of the capacitor electrode material or (ii) the cathode of the electrochemical cell includes a layer of the resin-bonded particles of the cathode battery electrode material and a separate, porous, adjacent, coextensive layer of the particles of the capacitor electrode material.

7. An electrochemical cell comprising an anode, a cathode, and an electrolyte solution containing a lithium electrolyte salt dissolved in a non-aqueous liquid solvent; the electrochemical cell being further characterized in that:
the anode and the cathode of the electrochemical cell each contain a layer of resin-bonded particles of an anode battery electrode material and resin-bonded particles of a cathode battery electrode material, respectively, bonded to at least one side of a current collector foil, the resin-bonded particles of the anode battery electrode material and the resin-bonded particles of the cathode battery electrode material being capable of intercalating lithium from the electrolyte solution and de-intercalating lithium into the electrolyte solution so that the resin-bonded particles of the anode battery electrode material in the anode and the resin bonded particles of the cathode battery electrode material in the cathode can function as a lithium-ion battery cell; and
at least one of the anode or the cathode of the electrochemical cell also containing particles of a capacitor electrode material that are capable of adsorbing lithium cations or corresponding anions from the electrolyte solution and desorbing the lithium cations or the corresponding anions into the electrolyte solution to function as a capacitor, wherein the resin-bonded particles of the anode battery electrode material or a combination of the resin-bonded particles of the anode battery electrode material and the particles of the capacitor electrode material present in the anode, and the resin bonded particles of the cathode battery electrode material or a combination of the resin-bonded particles of the cathode battery electrode material and the particles of the capacitor electrode material in the cathode, provide equal electrochemical capacities in ampere-hours at each of the anode and the cathode and further provide a specified hybridized energy density (Wh/kg) and power density (W/kg) for the electrochemical cell, and
wherein only the anode contains the particles of the capacitor electrode material such that the electrochemical cell functions as a lithium-ion battery and a lithium-ion capacitor, or
wherein only the cathode contains the particles of the capacitor electrode material such that the electrochemical cell functions as a lithium-ion battery and a lithium-ion capacitor.

8. An electrochemical cell as set forth in claim 7, wherein only the cathode contains the particles of the capacitor electrode material such that the electrochemical cell functions as a lithium-ion battery and a lithium-ion capacitor.

9. An electrochemical cell as stated in claim 7, wherein only the anode contains the particles of the capacitor electrode material such that the electrochemical cell functions as a lithium-ion battery and a lithium-ion capacitor.

10. An electrochemical cell as stated in claim 7, wherein a capacity of the particles of the capacitor electrode material in the cathode is less than a capacity of the particles of the capacitor electrode material in the anode such that the electrochemical cell functions as a lithium-ion battery, a lithium-ion capacitor, and a capacitor.

11. A method of forming an electrochemical cell comprising an anode, a cathode, and an electrolyte solution containing a lithium electrolyte salt dissolved in a non-aqueous liquid solvent; the method comprising:
applying particles of active anode material as a porous layer of anode material to at least one side of an anode current collector foil for the electrochemical cell, the particles of active anode material being composed for intercalating and de-intercalating lithium ions from the electrolyte solution so that that the particles of active anode material can function as a lithium-ion battery cell;
applying particles of active cathode material as a porous layer of cathode material to at least one side of a cathode current collector foil, the particles of active cathode material being composed for intercalating and de-intercalating lithium ions from the electrolyte solution; and
applying particles of an active capacitor material, which are composed to adsorb lithium cations or corresponding anions from the electrolyte solution and to desorb the lithium cations or the corresponding anions into the electrolyte solution in the nature of a capacitor, to at least one of the anode current collector foil or the cathode current collector foil, wherein a combination of amounts and proportions of the particles of active anode material in the anode, the particles of active cathode material in the cathode, and the particles of the active capacitor material in the anode and/or the cathode provides equal electrochemical capacities in ampere-hours at each of the anode and the cathode and further provides a specified hybridized energy density (Wh/kg) and power density (W/kg) for the electrochemical cell, and
wherein a capacity of the particles of the capacitor electrode material in the anode is less than a capacity of the particles of the capacitor electrode material in the cathode such that the electrochemical cell functions as a lithium-ion battery, a lithium-ion capacitor, and a capacitor.

12. A method of forming the electrochemical cell as set forth in claim 11, comprising
applying the particles of the active capacitor material only to the cathode current collector foil in combination with the particles of active cathode material such that the electrochemical cell functions as a lithium-ion battery and a lithium-ion capacitor.

13. A method of forming the electrochemical cell as set forth in claim 11, comprising:
applying the particles of the active capacitor material to the anode current collector foil in combination with the particles of active anode material, and;
applying the particles of the active capacitor material to the cathode current collector foil in combination with the particles of active cathode material.

14. A method of forming the electrochemical cell as set forth in claim 11, comprising:
applying the particles of the active capacitor material to the anode current collector foil in combination with the particles of active anode material; or
applying the particles of the active capacitor material to the cathode current collector foil in combination with the particles of active cathode material.

15. A method of forming the electrochemical cell as set forth in claim 11, comprising applying the particles of the active capacitor material to the anode current collector foil in combination with the particles of active anode material as a single porous resin-bonded electrode layer or (ii) applying the particles of the active capacitor material to the cathode current collector foil in combination with the particles of active cathode material as a single porous resin-bonded electrode layer.

16. A method of forming the electrochemical cell as set forth in claim 11, comprising applying the particles of the active capacitor material to the anode current collector foil in a separate, porous overlying, coextensive layer adjacent to a layer of the particles of active anode material or (ii) applying the particles of the active capacitor material to the cathode current collector foil in a separate, porous, overlying, coextensive layer adjacent to a layer of the particles of active cathode material.

* * * * *